United States Patent [19]

Brandenburg, Jr.

[11] 4,107,512
[45] Aug. 15, 1978

[54] INSULATED RADIANT HEATER

[76] Inventor: Frank J. Brandenburg, Jr., Rte. 3, Box 28, Ashland, Va. 23005

[21] Appl. No.: 713,215

[22] Filed: Aug. 10, 1976

[51] Int. Cl.² .................. H05B 3/02; F24H 9/08; F28F 13/00
[52] U.S. Cl. ...................... 219/343; 165/49; 165/53; 165/136; 219/345; 219/460; 219/541
[58] Field of Search .................. 219/339–358, 219/531, 536, 455–468, 443, 213; 165/49, 53–55, 136

[56] References Cited

U.S. PATENT DOCUMENTS

| 1,789,269 | 1/1931 | Beach | 219/346 X |
| 2,026,797 | 1/1936 | Pierson | 219/455 X |
| 2,458,184 | 1/1949 | Marick | 219/345 X |
| 2,570,975 | 10/1951 | Osterheld | 219/459 |
| 3,786,230 | 1/1974 | Brandenburg | 219/345 |

FOREIGN PATENT DOCUMENTS

| 813,631 | 3/1937 | France | 219/459 |
| 1,078,795 | 5/1954 | France | 219/345 |
| 1,082,763 | 6/1954 | France | 219/345 |
| 1,167,155 | 7/1958 | France | 219/345 |
| 431,849 | 3/1948 | Italy | 219/459 |
| 421,270 | 12/1934 | United Kingdom | 219/345 |

Primary Examiner—A. Bartis
Attorney, Agent, or Firm—Clarence A. O'Brien; Harvey B. Jacobson

[57] ABSTRACT

A radiant heater for installation in or support from ceilings, walls or similar supporting arrangements in which a corrugated heated panel of metallic construction radiates heat with the radiant heater panel being enclosed peripherally by an inwardly facing, channel-shaped frame of metallic construction in which the frame is completely insulated from the heated metal panel thereby maintaining the peripheral frame at a substantially lower temperature than the heated metal panel which, in turn, enables the heated metal panel to be heated to a substantially higher temperature than is normally employed in such panels while maintaining the frame at a relatively low temperature in order to satisfy various building code regulations and maintain the contact with supporting structure at a safe temperature level. In one embodiment of the invention, insulation is provided completely across the upper surface of the panel to reduce upward radiation of heat. In another embodiment, the upper surface of the heated metal panel is exposed except for the portion which is insulated from the frame. In both embodiments, the frame is completely insulated from the heated metal panel which radiates heat with the insulation extending peripherally inwardly of the inner edge of the frame to assure that no radiant heat will come into contact with the frame.

5 Claims, 4 Drawing Figures

INSULATED RADIANT HEATER

BACKGROUND OF THE INVENTION

1. Field of the Invention

The present invention generally relates to a radiant heating panel and more particularly a panel in which the metallic frame of the panel assembly is completely insulated from the hot metal panel which radiates heat, thus enabling the hot panel which radiates heat to be heated to a temperature substantially above the temperature of the frame thereby facilitating installation of the radiant panel in various types of installations which require that the supporting frame structure be maintained at a relatively low temperature.

2. Description of the Prior Art

My prior U.S. Pat. No. 3,786,230 issued Jan. 15, 1974 discloses a radiant heater in which a corrugated panel with resistance heating elements connected thereto in a unique manner is provided with a frame and supported in any suitable manner from a wall structure or other support. The prior art made of record by the U.S. Patent and Trademark Office in my prior patent also disclose various developments in this field of endeavor. The radiant heater in my above mentioned patent performs satisfactorily but in certain installations, it is desired to maintain the peripheral frame of the heater at a temperature lower than the temperature of the heated panel which radiates heat.

SUMMARY OF THE INVENTION

An object of the present invention is to provide a radiant heater in which the heated panel which radiates heat is supported from a peripheral frame having heat conducting properties in which the heated panel is completely insulated from the frame to substantially preclude the frame from being heated by conduction and radiation of heat from the heated panel, thereby enabling the heated panel to be heated to a relatively high temperature while maintaining the frame at a relatively low temperature to facilitate support of the frame from various building components, building materials or other supporting structures without danger of such supporting structures being heated to an unsafe temperature.

A further object of the invention is to provide an insulated radiant heater in accordance with the preceding object in which the panel is in the form of a corrugated metal panel having the entire upper surface thereof insulated, thereby reducing radiation of heat upwardly from the panel and reducing the energy required to maintain the panel at a predetermined elevated temperature.

A further object of the invention is to provide a radiant heater including a corrugated metal panel heated to an elevated temperature for radiating heat therefrom in which the periphery of the panel is received within an inwardly opening U-shaped peripheral frame of metal construction with the periphery of the heated metal panel being insulated from the frame in which the insulation extends inwardly beyond the inner peripheral edges of the frame sufficiently to prevent radiant heat from contacting the metal frame, thereby maintaining the metal frame at a relatively lower temperature than the heated panel which radiates heat.

Still another important object of the present invention is to provide an insulated radiant heater in accordance with the preceding objects which is quite simple in construction, efficient in use of electrical energy, effective in radiating heat and extremely safe in use since the peripheral frame of the radiant heater is maintained at a substantially lower temperature than the radiant panel itself thereby enabling the frame to be supported in engagement with various supporting structures.

These, together with other objects and advantages which will become subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
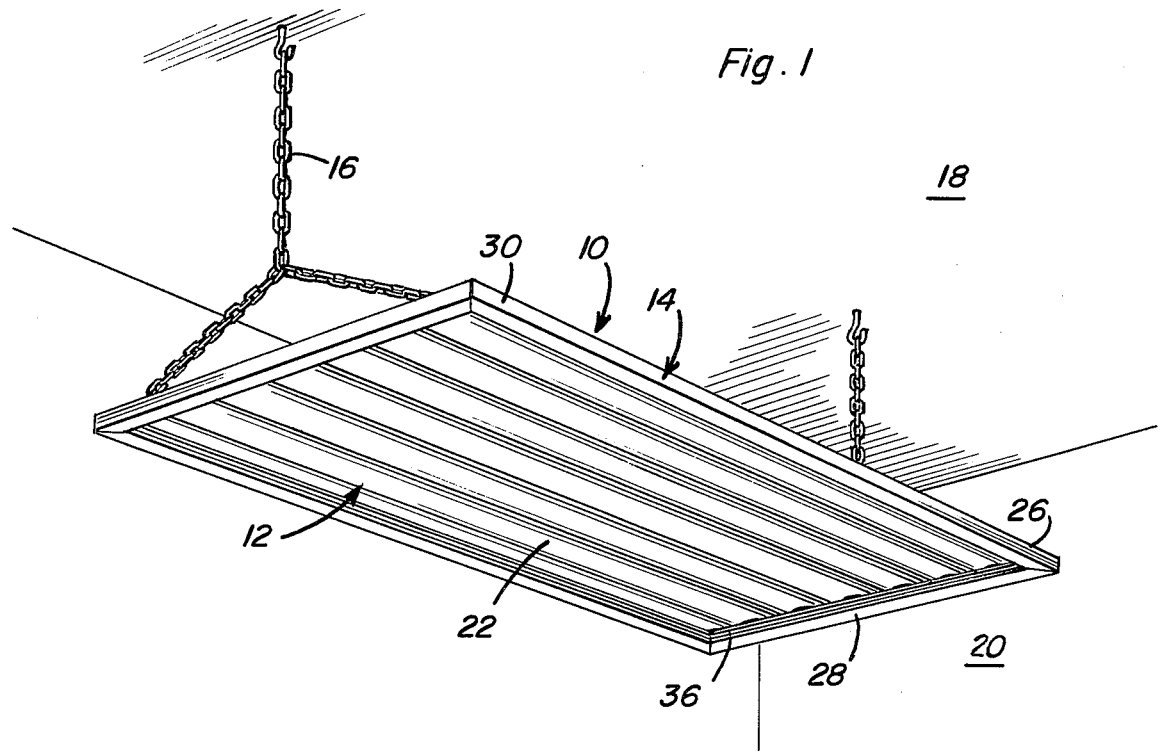
FIG. 1 is a perspective view of the radiant heater of the present invention illustrating a typical installation.

The insulated radiant heater of the present invention is generally designated by numeral 10 and includes a heating panel generally designated by numeral 12 and a peripheral frame generally designated by numeral 14 in which the frame is supported from a building structure by suitable support means such a pair of chains 16 suspended from a ceiling 18 inwardly from a peripheral wall 20. Any other suitable type of support may be provided for the radiant heater 10, and it may be constructed for support in a suspended ceiling or dropped ceiling, in a wall structure or in any other manner desired.

Figure 2:
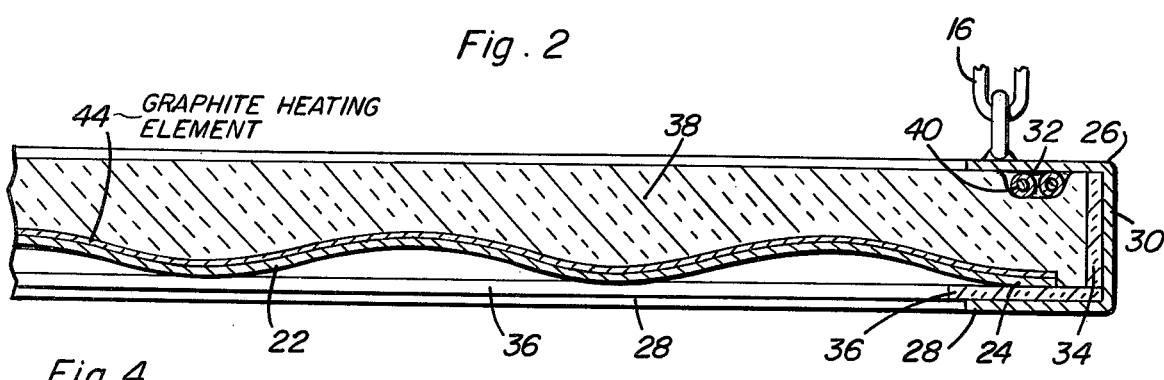
FIG. 2 is a fragmental, transverse sectional view, on an enlarged scale, illustrating an embodiment of the invention in which the metal peripheral frame is insulated from the heated metal radiant panel and the entire upper surface of the radiant panel is also insulated.

As illustrated in FIG. 2, the radiant panel 12 is in the form of a corrugated metal panel 22 of aluminum or similar metal material in which the corrugations are smoothly curved undulations such that when the panel 22 is heated, radiant heat will be discharged therefrom in a diffused and even pattern over a relatively wide area. The peripheral edge of the heated panel 22 as designated by numeral 24 in FIG. 2 is oriented and received within the peripheral frame 14 which is in the form of a channel-shaped member 26 having a bottom flange 28, a vertical outer edge flange 30 and a top flange 32 in which the bottom flange 28 and top flange 32 are substantially parallel to each other and the outer flange 30 is perpendicular thereto with the channel-shaped member 26 being constructed of metal and a standard channel-shaped member which is of U-shaped configuration with the U-shaped channel opening inwardly and receiving the peripheral edge 24 of the heated panel 22.

The inner surface of the vertical flange 30 is provided with a layer of insulation 34 and the inner surface of the bottom flange 28 is provided with a layer of insulation 36 which has the outermost peripheral edge thereof engaging the inner surface of the vertical flange 30 with the bottom edge of the insulation 34 engaged with the inner surface of the vertical flange 30 resting on the top surface of the outermost perimetrical area of the insulation 36 is illustrated in FIG. 2. The inner perimeter of the insulation 36 is disposed inwardly of the inner perimeter of the bottom flange 28 so that the insulation 36 actually overhangs the edge of the metal bottom flange 28. This arrangement prevents radiant heat emitted from the heated panel 22 from coming into contact with the bottom flange 28. Also, the insulation 36 between the flange 28 and the edge portion of the heated panel 22 prevents conduction of heat or radiation of heat from the panel 22 into the flange 28. Further, the insulation 34 precludes conduction of or radiation of heat from the periphery of the heated panel 22 into the metal flange 30.

The upper surface portion of the heated radiant panel 22 is insulated by insulation material or an insulating panel 38 which completely covers the heated radiant metal panel 22 and extends continuously in overlying relation to the panel 22 into engagement with the inner surface of the insulation material 34 disposed against the inner surface of the vertical metal flange 30 of the frame as illustrated in FIG. 2. The insulation material 38 will extend down around the peripheral edge 24 of the panel 22 anywhere that it is spaced from the insulation 34 thus enhancing the insulation of the panel 22 from the frame 14. Also, the insulation material 38 may be of resilient, cellular material such that electrical supply conductors 40 may be positioned along the inner surface of the top flange 32 with the inherent resiliency of the insulation material 38 retaining the conductors in place or the conductors may be anchored to the flange 32 in any suitable manner with the conductors being connected to an electrical supply in any suitable and well known manner. Also, as illustrated in FIG. 2, the supporting chains 16 may be attached to the top flange 32 by a rigid connection of any suitable type.

Figure 3:
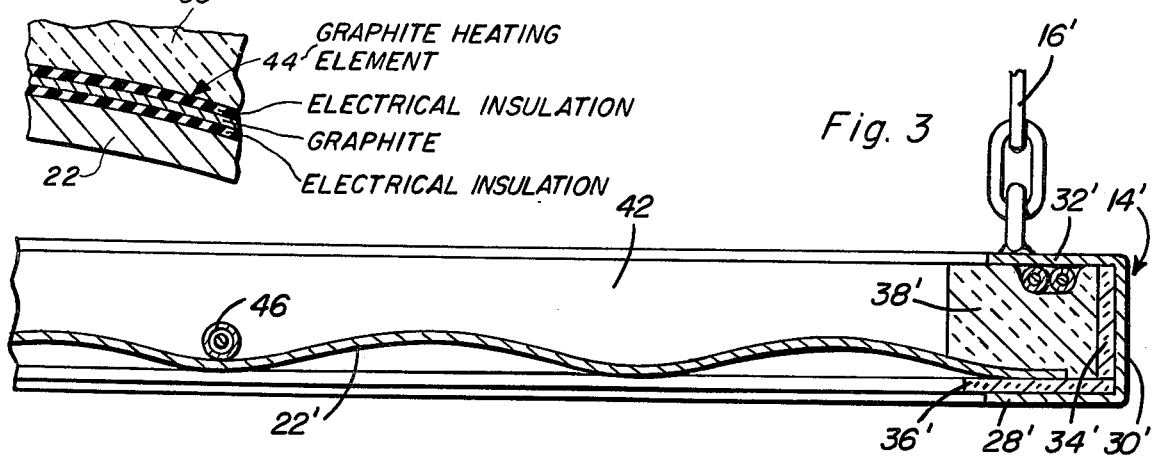
FIG. 3 is a sectional view similar to FIG. 2 but illustrating the embodiment of the invention in which the upper surface of the radiant panel is exposed so that radiant heat can pass upwardly from the panel.

FIG. 3 illustrates another embodiment of the invention in which the heated panel 22' is received in the frame 14' in the same manner and insulated therefrom in the same manner with this embodiment of the invention including an open top area 42 above the heated panel 22 so that radiant heat may radiate upwardly as well as downwardly from the metal panel 22'. In this construction, insulating material 38' is disposed above the heated panel 22' only in the area of the frame as illustrated with the inner edge of the insulation material 38' extending beyond the inner edge of the upper flange 32' so that it, in effect, overhangs the inner edge of the upper flange 32' and prevents contact of radiant heat with the upper flange 32' of the frame 14'. Thus, the heated metal radiant panel 22' is fully insulated from the frame 14' in the same manner as in FIG. 2.

Figure 4:
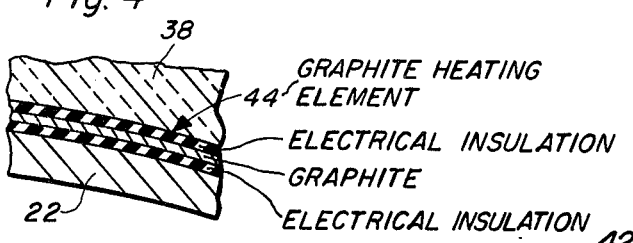
FIG. 4 is a detail sectional view of a portion of FIG. 2.

FIGS. 2 and 3 also illustrate two embodiments of structure for heating the metal panel, either of which may be used. In FIGS. 2 and 4, the heating element may be in the form of a graphite element 44 laminated to the heated panel 22 and electrically insulated therefrom in a well known manner. Such structures are known with the graphite heating element being electrically insulated from the metal panel and also electrically insulated from the insulation material so that, in effect, the heating element 44 includes three layers laminated to the metal panel 22 as shown in FIG. 4. In FIG. 3, resistance type heating tubes 46 are secured to the upper surface of the heated metal panel 22 in any suitable manner in good heat conducting relation thereto with this arrangement being well known such as illustrated in my prior U.S. Pat. No. 3,786,230. Thus, the heating element may be bonded to the metal heating panel, or the metal heating panel may be partially deformed around the heating element or any other means may be provided for heating the corrugated or undulating heating panel 22 or 22'. Insulation of the frame from the heating panel enables the heating panel to be heated to a relatively high temperature, generally in the range of 300° to 450° Fahrenheit, while maintaining the frame at a relatively low, safe temperature, generally in the range of 180° Fahrenheit and less than the maximum permissible temperature of 190° Fahrenheit, which is required by various building regulations, building codes, insurance companies and the like. Retention of the frame at a relatively low temperature enables the frame to be supported directly from building structural components such as the T-bars employed in supporting dropped ceilings. This enables the radiant heater to be constructed of standard size modules, such as 2 feet by 4 feet, so that such modules may be used as a replacement for a normally suspended ceiling panel module thereby enhancing the facility with which the radiant heater is installed and supported.

The radiant heater which is open at the top as illustrated in FIG. 3 is best suited for insulated buildings in which the ceiling is relatively low so that the upwardly emitted radiant heat, in effect, heats the ceiling to provide a second warm area, in addition to the radiant heater itself, thereby providing a more even comfort zone and more efficient utilization of the radiant heat. The insulated arrangement illustrated in FIG. 2 is well suited for spot heating of work areas or the like especially in buildings having high bay areas. This arrangement is best used in uninsulated ceilings or building to provide more radiant heat passing downwardly and, in effect, provide a warm curtain between occupants of the area and cold areas. The radiant heater may be constructed with various heating capacities depending upon the installation requirements and depending upon the size of the unit to be installed with the insulating features not only maintaining the temperature differential but also acoustically isolating the metal heating panel from the metal frame to reduce noise that may occur due to expansion, vibration and the like. The insulating material may be of various conventional materials such as compressed fiberglass material around the periphery of the frame and rather loose, batt fiberglass on top of the heated panel.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A radiant heater comprising a high temperature heat radiating panel, peripheral frame means for supporting said panel, said frame means including an inwardly opening channel-shaped frame having a bottom horizontal flange, an outer wall flange, and a top flange extending in overlying spaced relation to the bottom flange, said panel including a peripheral edge received between the bottom and top flanges, and insulating means interposed between said frame means and the panel for reducing heat transmission from the panel to the frame means to maintain the frame means at a substantially lower temperature than the panel, said insulating means including a layer of insulating material covering the upper surface of the bottom flange of the frame and supporting the edge of the panel therefrom, a layer of insulating material covering the inner surface of the wall flange of the frame, and insulating material between the edge of the panel and the top flange of the frame, the layer of insulating material covering the bottom flange further extending inwardly beyond the inner edge of the bottom flange a distance sufficient to prevent radiant heating of the frame from the panel, the insulating material between the edge of the panel and the top flange of the frame extending inwardly beyond the inner edge of the top flange at least a distance sufficient to prevent radiant heating of the frame from the panel.

2. The radiant heater as defined in claim 1 wherein said insulating material between the edge of the panel and the top flange of the frame is substantially thicker than the layers of insulating material.

3. The radiant heater as defined in claim 2 wherein said insulating material between the edge of the panel and the top flange of the frame extends completely across the top surface of the panel to reduce upward flow of radiant heat from the panel.

4. The radiant heater as defined in claim 2 together with electrical conductors disposed along the inner surface of the top flange between the top flange and the insulating material with the insulating material being compressed downwardly sufficiently to receive the conductors.

5. The radiant heater as defined in claim 1 wherein said panel is a corrugated panel.

* * * * *